(12) United States Patent
Liang et al.

(10) Patent No.: US 11,550,417 B2
(45) Date of Patent: Jan. 10, 2023

(54) TOUCHSCREEN FOR NARROW-FRAME ELECTRONIC DEVICE, AND ELECTRONIC DEVICE

(71) Applicant: HUAWEI TECHNOLOGIES CO., LTD., Shenzhen (CN)

(72) Inventors: Yanfeng Liang, Shanghai (CN); Shanshan Wei, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/422,899

(22) PCT Filed: Jan. 17, 2020

(86) PCT No.: PCT/CN2020/072703
§ 371 (c)(1),
(2) Date: Jul. 14, 2021

(87) PCT Pub. No.: WO2020/156234
PCT Pub. Date: Aug. 6, 2020

(65) Prior Publication Data
US 2022/0075472 A1 Mar. 10, 2022

(30) Foreign Application Priority Data
Feb. 1, 2019 (CN) .......................... 201910105116.4

(51) Int. Cl.
*G06F 3/041* (2006.01)
*G06F 3/044* (2006.01)
*G06F 1/16* (2006.01)

(52) U.S. Cl.
CPC .......... *G06F 3/0412* (2013.01); *G06F 1/1656* (2013.01); *G06F 3/0446* (2019.05)

(58) Field of Classification Search
CPC ..... G06F 3/0412; G06F 3/0446; G06F 1/1656
See application file for complete search history.

(56) References Cited

U.S. PATENT DOCUMENTS

| 6,104,464 A | 8/2000 | Adachi et al. |
| 2016/0147361 A1* | 5/2016 | Ahn ........................ G06F 3/041 345/173 |

(Continued)

FOREIGN PATENT DOCUMENTS

| CN | 103425318 A | 12/2013 |
| CN | 203588244 U | 5/2014 |

(Continued)

OTHER PUBLICATIONS

Li Rong, "Study on Electrostatic Protection for Small Size LCM", Dalian University of Technology, 2015, Issue 07, 2 Pages (abstract).

*Primary Examiner* — Peter D McLoone
(74) *Attorney, Agent, or Firm* — Maier & Maier, PLLC

(57) ABSTRACT

A touchscreen for a narrow-frame electronic device including a conductive layer, a display module, a first circuit board, and a second circuit board. The conductive layer includes a touch sensing electrode and N first traces. The first circuit board includes a touch driving integrated circuit. The second circuit board includes at least one wire. The touch sensing electrode is coupled to a first end of each of the N first traces. A second end of each of M first traces is coupled to a first end of one wire on the second circuit board through the display module, and a second end of each wire on the second circuit board is coupled to the touch driving integrated circuit. The at least one wire on the second circuit board is configured to couple the second end of each of the M first traces to the touch driving integrated circuit.

20 Claims, 13 Drawing Sheets

(56) References Cited

U.S. PATENT DOCUMENTS

| | | |
|---|---|---|
| 2017/0010738 A1 | 1/2017 | Kurasawa et al. |
| 2018/0188880 A1 | 7/2018 | Wang et al. |
| 2018/0203555 A1 | 7/2018 | Miyamoto |
| 2018/0321765 A1 | 11/2018 | Chiang et al. |
| 2021/0097900 A1* | 4/2021 | Cui ................. G06F 3/0412 |

FOREIGN PATENT DOCUMENTS

| | | |
|---|---|---|
| CN | 104536610 A | 4/2015 |
| CN | 204360347 U | 5/2015 |
| CN | 104904327 A | 9/2015 |
| CN | 105807992 A | 7/2016 |
| CN | 106249940 A | 12/2016 |
| CN | 106406612 A | 2/2017 |
| CN | 106505089 A | 3/2017 |
| CN | 106803514 A | 6/2017 |
| CN | 106951125 A | 7/2017 |
| CN | 107393422 A | 11/2017 |
| CN | 107797708 A | 3/2018 |
| CN | 108012458 A | 5/2018 |
| CN | 108762558 A | 11/2018 |
| CN | 108762562 A | 11/2018 |
| CN | 108803923 A | 11/2018 |
| CN | 109240533 A | 1/2019 |
| CN | 109828691 A | 5/2019 |
| CN | 112684939 B | 12/2021 |
| WO | 2017039129 A1 | 3/2017 |

\* cited by examiner

TO

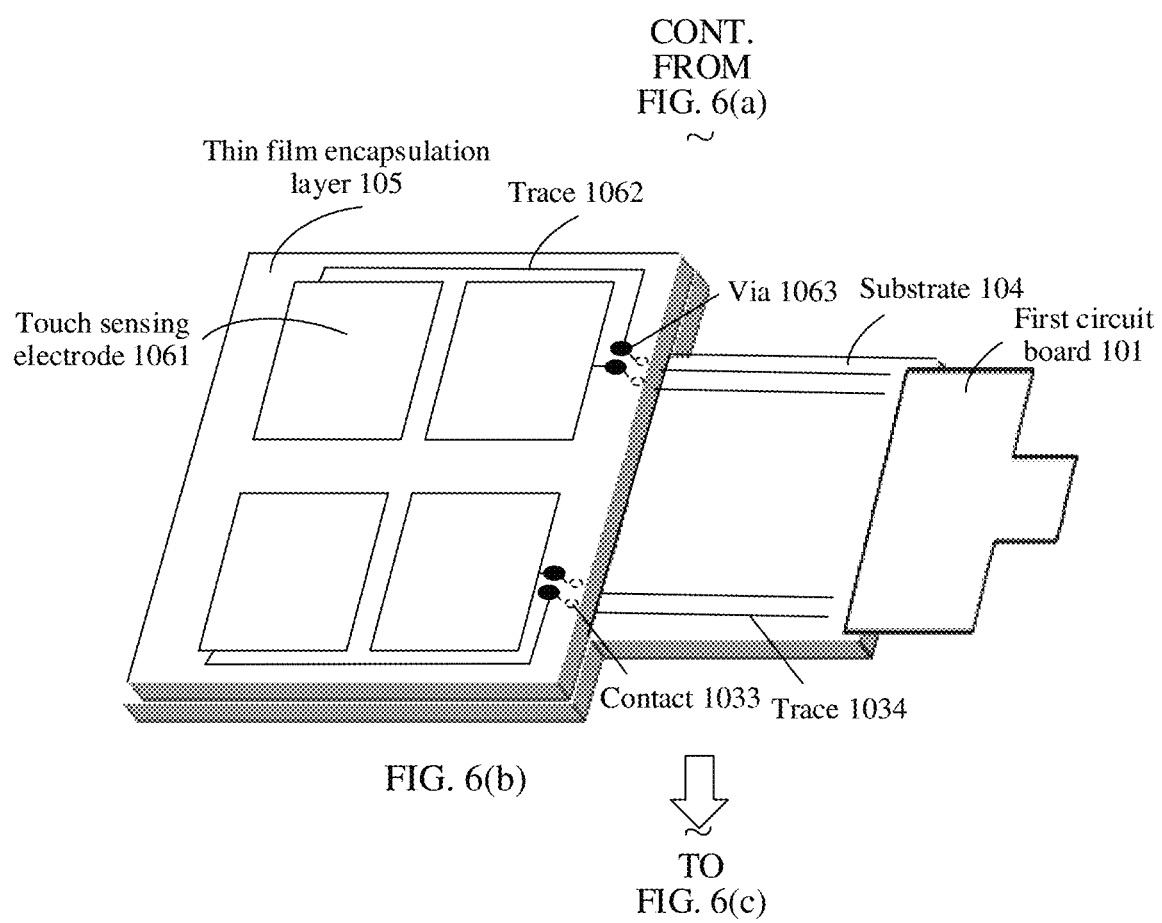

TOUCHSCREEN FOR NARROW-FRAME ELECTRONIC DEVICE, AND ELECTRONIC DEVICE

This application is a national stage of International Application No. PCT/CN2020/072703, filed on Jan. 17, 2020, which claims priority to Chinese Patent Application No. 201910105116.4, filed with the China National Intellectual Property Administration on Feb. 1, 2019. Both of the aforementioned applications are hereby incorporated by reference in their entireties.

TECHNICAL FIELD

This embodiments relate to the field of electronic technologies, and in particular, to a touchscreen for a narrow-frame electronic device, and an electronic device.

BACKGROUND

With continuous development of functions of electronic devices, touchscreens are increasingly widely used in electronic devices such as mobile phones and tablet computers. A touchscreen can detect a user finger or another object placed on a surface of the touchscreen, and can identify a location at which the finger or the object is placed.

Currently, a conductive layer 106 on the touchscreen is configured to detect a touch operation. As shown in FIG. 1A, the touchscreen may include a flexible printed circuit (FPC) 101, a substrate 104, a display layer 103, a thin film encapsulation layer (TFE) 105, and the conductive layer 106. The conductive layer 106 of the touchscreen may be disposed on the thin film encapsulation layer 105. The conductive layer 106 includes a touch sensing electrode (TS) 1061 and a trace 1062. The touch sensing electrode 1061 is coupled to a touch driving integrated circuit (TIC) 1011 on the FPC through the trace 1062 and a via 1063 on the TFE, to output a touch signal to the TIC 1011. A plurality of traces 1062 at the conductive layer 106 may be gathered to a region 1051 that is at the TFE and that corresponds to a lower frame of the touchscreen, and vias are disposed in a specific region Z in the region 1051 to lead out the traces 1062.

However, when there are a relatively large quantity of traces 1062, to avoid crossover of the traces 1062, a relatively wide lower frame of the touchscreen is required to route the traces in a corresponding region on the TFE 105. As a result, a relatively wide region of the lower frame of the touchscreen cannot be used for display or touch control. This reduces a screen-to-body ratio of an electronic device.

As shown in FIG. 1B, to reduce a width of the lower frame of the touchscreen, two specific regions (a specific region Z1 and a specific region Z2) in the corresponding region 1051 on the TFE 105 may be used to provide vias 1063 for traces 1062. Two parts of traces are separately led out through the vias 1063 in the two specific regions, and are gathered to the TIC 1011 on the FPC 101 by using wires. However, the wires on the FPC 101 that are used to couple the two parts of traces cross over other wires on the FPC 101, causing signal interference. To reduce interference, a quantity of layers of the FPC 101 needs to be increased. This increases process complexity and costs of the FPC 101.

Therefore, how to reduce process complexity and costs of a touchscreen with a relatively narrow lower frame is an issue that urgently needs to be addressed.

SUMMARY

The embodiments disclose a touchscreen for a narrow-frame electronic device, and an electronic device, to reduce a width of a frame of a touchscreen and increase a screen-to-body ratio. In addition, a quantity of layers of a circuit board is reduced, thereby reducing process difficulty and costs.

According to a first aspect, an embodiment provides a touchscreen. The touchscreen includes a conductive layer, a display module, a first circuit board, and a second circuit board. The conductive layer includes a touch sensing electrode and N first traces, where N is greater than or equal to 2. The first circuit board includes a touch driving integrated circuit. The second circuit board includes at least one wire. The touch sensing electrode is coupled to a first end of each of the N first traces. A second end of each of M first traces is coupled to a first end of one wire on the second circuit board through the display module, and a second end of each wire on the second circuit board is coupled to the touch driving integrated circuit, where M is less than or equal to N, and the N first traces include the M first traces. The display module is configured to perform display. The touch sensing electrode is configured to generate a detection signal when a touch operation is performed on the touchscreen. The at least one wire on the second circuit board is configured to couple the second end of each of the M first traces to the touch driving integrated circuit. The touch driving integrated circuit is configured to drive the touch sensing electrode, and receive the detection signal generated by the touch sensing electrode.

In the touchscreen, the trace at the conductive layer is coupled to the touch driving integrated circuit through the wire on the second circuit board, to drive and perform detection for the conductive layer, without adding a wire on the first circuit board for coupling to the trace at the conductive layer, thereby reducing wire crossover on the first circuit board, and reducing interference caused by wire crossover. In addition, a quantity of layers of the first circuit board can be reduced, thereby reducing process difficulty and costs.

In a possible implementation, the first circuit board further includes a first opening, and the second circuit board further includes a second opening. An anisotropic conductive film is included between the first opening and the second opening. The second end of each wire on the second circuit board is coupled to the touch driving integrated circuit through the second opening, the anisotropic conductive film, and the first opening.

In a possible implementation, the display module includes a thin film encapsulation layer, a display layer, and a substrate. The thin film encapsulation layer and the substrate are configured to encapsulate the display layer. The display layer is configured to perform display. The thin film encapsulation layer includes at least two vias. Each of the N first traces corresponds to one via at the thin film encapsulation layer. The at least two vias are dispersedly disposed in specific regions at the thin film encapsulation layer. The specific region is a region that is at the thin film encapsulation layer and that corresponds to a frame of the touchscreen. The second end of each of the M first traces is coupled to the first end of the one wire on the second circuit board through a corresponding via.

In this embodiment, there may be a plurality of first traces, and the first traces and vias may be in a one-to-one correspondence, that is, one first trace corresponds to one via.

In some embodiments, the vias and contacts are also in a one-to-one correspondence, that is, one via corresponds to one contact.

In some other embodiments, some or all vias may have no corresponding contacts, for example, in a scenario in which a second end of a first trace is directly coupled to a first end of one wire on the second circuit board through a corresponding via.

The contacts and second traces may be in a one-to-one correspondence, that is, one contact corresponds to one second trace.

The specific region and a specific region may be disposed near an edge of the thin film encapsulation layer (for example, an edge, of the thin film encapsulation layer, that corresponds to a lower frame of the touchscreen) as close as possible.

In the touchscreen, the at least two vias are dispersedly disposed in specific regions Z1 and Z2 at the thin film encapsulation layer, and the specific regions Z1 and Z2 are provided as the edge of the thin film encapsulation layer that corresponds to the lower frame of the touchscreen. In this way, when the thin film encapsulation layer at which the vias are dispersedly disposed is assembled to the touchscreen, a width of a frame of the touchscreen can be reduced, thereby increasing a screen-to-body ratio.

In a possible implementation, the substrate further includes at least two contacts. Each of the N first traces corresponds to one contact on the substrate. At least two second traces are routed on the substrate. Each of the at least two contacts is configured to be coupled to a second end of one first trace, and coupled to a first end of one second trace. A second end of each second trace is coupled to a first end of one wire on the second circuit board.

In a possible implementation, a second end of each of the N first traces may be directly coupled to a first end of one wire on the second circuit board through a corresponding via.

In a possible implementation, each of the at least two contacts may correspond to one second trace on the substrate. The second end of each second trace is coupled to the first end of the one wire on the second circuit board through the substrate; or the second end of each second trace is coupled to the first end of the wire on the second circuit board sequentially through the substrate and the first circuit board.

In a possible implementation, the substrate may further include at least two contacts. Each of the N first traces corresponds to one contact on the substrate. At least two second traces are routed on the substrate. Each of the at least two contacts corresponds to one second trace on the substrate. In the at least two second traces, second ends of some second traces each are coupled to a first end of one wire on the second circuit board, and second ends of the other second traces each are coupled to the touch driving integrated circuit sequentially through the substrate, the first circuit board, and the first opening.

In a possible implementation, the substrate may further include a contact, where a quantity of contacts is less than N. Each of the contacts corresponds to one second trace on the substrate. The second end of each of the M first traces is directly coupled to the first end of the one wire on the second circuit board through the corresponding via. A second end of each of (N-M) first traces other than the M first traces is coupled to the touch driving integrated circuit through the via, the contact, the second trace corresponding to the contact, the first circuit board, and the first opening.

In another possible implementation, the M first traces may include S first traces, where S is less than or equal to M. A second end of each of the S first traces is directly coupled to a first end of one wire on the second circuit board through a corresponding via. A second end of each of (M-S) first traces other than the S first traces in the M first traces is coupled to a first end of one wire on the second circuit board through the via, the contact, and the second trace corresponding to the contact. A second end of each of (N-M) first traces other than the M first traces in the N first traces is coupled to the touch driving integrated circuit through the via, the contact, the second trace corresponding to the contact, the first circuit board, and the first opening.

When the second trace is routed on the first circuit board, the second trace may be routed along an edge of the first circuit board, without crossing over a wire on the first circuit board.

In a possible implementation, the second trace is bonded to the substrate or the first circuit board by using the anisotropic conductive film.

In a possible implementation, the first circuit board and the display module may be bonded by using the anisotropic conductive film, or welded by using solder; the second circuit board and the display module are bonded by using the anisotropic conductive film, or welded by using solder; and the second circuit board and the first circuit board are bonded by using the anisotropic conductive film, or welded by using solder.

In a possible implementation, a surface of the first circuit board and a surface of the second circuit board each include a protective film. The protective film is configured to shield signal interference caused by crossover of wires on the first circuit board and the second circuit board. In this embodiment, the surface of the first circuit board and the surface of the second circuit board each include the protective film, that is, no signal interference exists between the wires on the first circuit board and the second circuit board. Therefore, in this embodiment, a plurality of first traces at the conductive layer can be coupled to the touch driving integrated circuit on the first circuit board by simply adding one second circuit board, without adding a plurality of layers of wires on the first circuit board. Compared with a high-cost circuit board with a plurality of layers of wires, the second circuit board added in this embodiment has very low costs.

A shape of the second circuit board and a location of the second circuit board on the first circuit board are not limited.

A fabrication process flow of the touchscreen may include: fabricating the conductive layer on the display module, connecting the first circuit board to the display module, and connecting the second circuit board to the first circuit board.

The fabricating the conductive layer may include fabricating the touch sensing electrode and a trace. The conductive layer may be fabricated by using a printing process.

The fabricating the conductive layer on the display module may further include coupling the trace at the conductive layer to a contact on the substrate through a via, and then routing a trace on the substrate and coupling the trace to the contact.

The first circuit board may be connected to the display module through bonding or through welding by using solder. The second circuit board may also be connected to the first circuit board through bonding or through welding by using solder.

In the structure of the touchscreen, the substrate may be flexible, and may be bent, folded, or folded by 180°, to implement a very narrow lower frame of the touchscreen. Alternatively, a bending part may be at a location of the touchscreen other than the lower frame, for example, an upper frame. In this case, a very narrow upper frame may be implemented.

According to a second aspect, an embodiment provides an electronic device. The electronic device includes a processor and a touchscreen. The processor is coupled to the touchscreen. The processor is configured to input a signal to the touchscreen, and is further configured to receive a signal output by a touch driving integrated circuit in the touchscreen. The touchscreen is the touchscreen described in any one of the first aspect or the possible implementations of the first aspect.

BRIEF DESCRIPTION OF DRAWINGS

The following describes accompanying drawings used in the embodiments.

DESCRIPTION OF EMBODIMENTS

The following describes the embodiments with reference to the accompanying drawings in the embodiments. Terms used in the implementations of the embodiments are merely intended to describe exemplary embodiments, but are non-limiting.

Figure 1A:
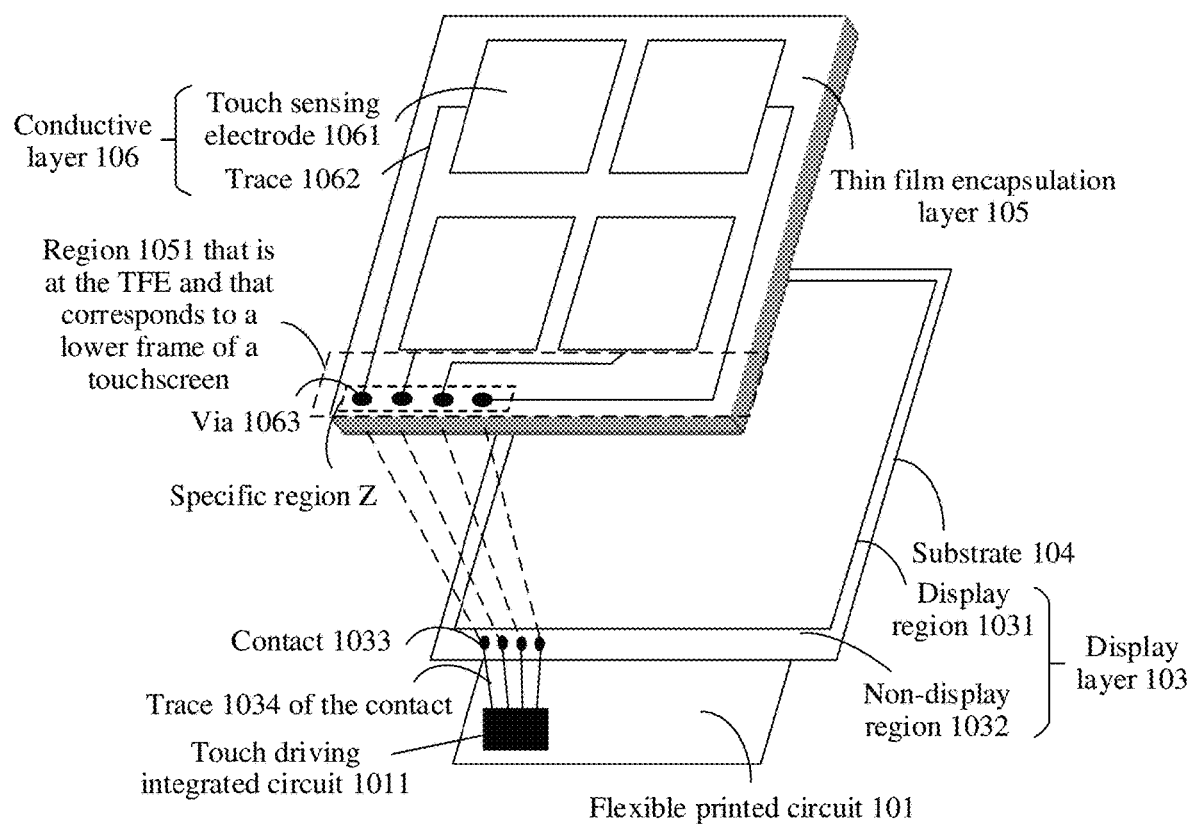
FIG. 1A is a schematic structural diagram of a touchscreen in the conventional technology.
Figure 1B:
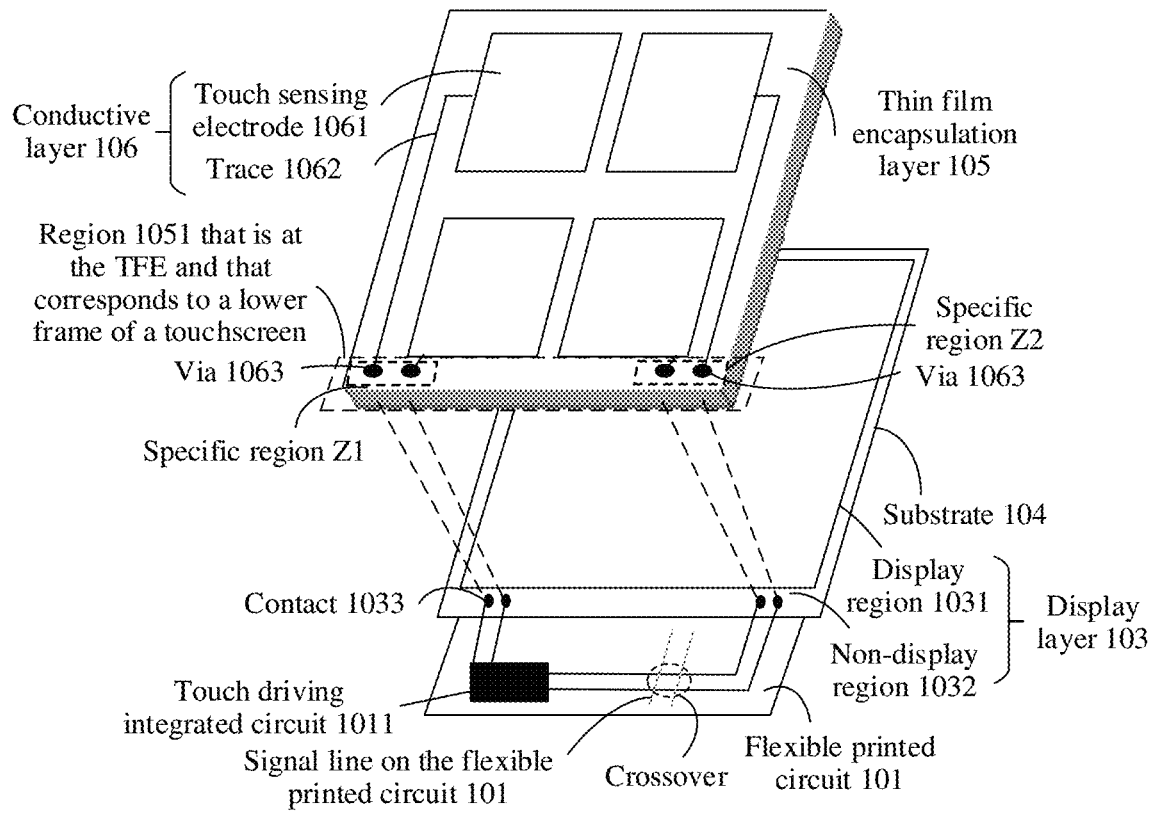
FIG. 1B is a schematic structural diagram of a touchscreen in the conventional technology.
Figure 2:
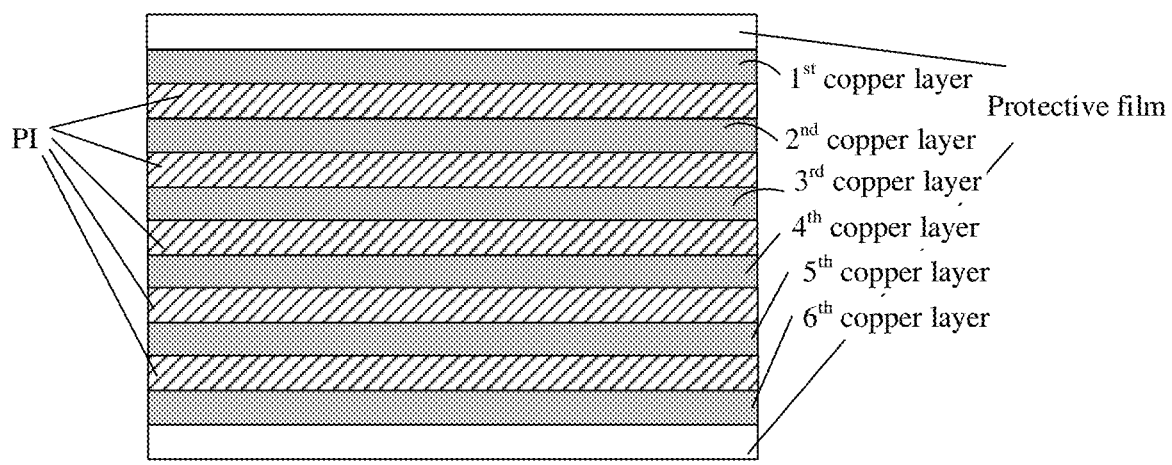
FIG. 2 is a schematic diagram of a layered structure of a circuit board in the conventional technology.

As shown in FIG. 1B, in the conventional technology, both a specific region Z1 and a specific region Z2 in a corresponding region 1051 on a TFE 105 may be used to provide vias 1063 for traces 1062. Two parts of traces are separately led out through the vias 1063 in the two specific regions, and are gathered to a TIC 1011 on an FPC 101 by using wires. However, the wires on the FPC 101 that are used to couple the two parts of traces cross over other wires on the FPC 101, causing signal interference. In the conventional technology, to reduce interference caused by wire crossover, a quantity of layers of the FPC 101 needs to be increased. This increases process complexity and costs of the FPC 101. FIG. 2 is a schematic structural diagram of a multilayer circuit board in the conventional technology. With reference to FIG. 1B and FIG. 2, to reduce signal interference caused by wire crossover, a quantity of layers of the FPC may be increased to couple the trace 1062 at a conductive layer 106 to the TIC. The "coupling" may be understood as a direct electrical connection or an indirect electrical connection. That the trace 1062 at the conductive layer 106 is coupled to the TIC may indicate that the trace 1062 at the conductive layer 106 is electrically connected to the TIC by using a wire, or may indicate that the trace 1062 at the conductive layer 106 is connected to the TIC by using an electronic element or a circuit.

As shown in FIG. 2, the FPC 101 may include six copper layers for routing wires. A polyimide film (PI) is disposed between any two copper layers for insulation. In addition, in the FPC 101, a copper layer needs to be disposed between two copper layers with wire crossover as a shield layer, to shield interference.

For example, as shown in FIG. 2, the $1^{st}$ copper layer may implement a power wire, the $2^{nd}$ copper layer may implement a driving wire, and the $4^{th}$ copper layer may implement an induction wire. If wire crossover occurs between the $2^{nd}$ copper layer and the $4^{th}$ copper layer, the $3^{rd}$ copper layer is disposed to implement a ground wire to shield signals between the $4^{th}$ layer and the $2^{nd}$ layer, to reduce signal interference caused by the wire crossover. The $6^{th}$ copper layer may implement a communications interface wire, for example, a mobile industry processor interface (MIPI) wire. The MIPI interface is configured to transmit display content of a touchscreen. If wire crossover occurs between the $4^{th}$ copper layer and the $6^{th}$ copper layer, the $5^{th}$ copper layer is disposed to implement a ground wire to shield signals between the $6^{th}$ layer and the $4^{th}$ layer, to reduce signal interference caused by the wire crossover.

The power wire is configured to be coupled to a power supply. The induction wire is configured to couple the trace 1062 at the conductive layer 106 to the touch driving integrated circuit 1011. The driving wire is configured to send, to the conductive layer 106, a driving signal output by the touch driving integrated circuit (DIC). The driving signal output by the DIC is used to enable a touch sensing electrode 1061 at the conductive layer 106 to form a capacitor with a specific capacitance value. When a user finger or another object is placed on the touchscreen, a capacitance value of the capacitor changes. A capacitance value variation of the capacitor may be used to determine a touch location on the touchscreen. The communication wire may include a wire for coupling the touch driving integrated circuit to a communications interface. For example, the communications interface is an interface configured to communicate with a CPU.

As shown in FIG. 2, the FPC 101 further includes two layers of protective films that are formed on two surfaces of the circuit board to protect the FPC from the outside.

Compared with an FPC with a few layers (for example, two or three layers), the six-layer FPC shown in FIG. 2 has a very complex fabrication process and very high costs. To reduce process difficulty and costs of a touchscreen, the embodiments provide a circuit board, a touchscreen, and an electronic device that have a few layers and a high screen-to-body ratio.

The circuit board and the touchscreen provided in the embodiments may be used in an electronic device. The electronic device may be implemented as any one of the following devices including a touchscreen: digital display products such as a mobile phone, a tablet computer, a portable game console, a personal digital assistant (PDA), a notebook computer, an ultra mobile personal computer (UMPC), a handheld computer, a netbook, a vehicle-mounted media playback device, a digital camera, a wearable electronic device, a virtual reality (VR) terminal device, an augmented reality (AR) terminal device, and a printer.

Figure 3:
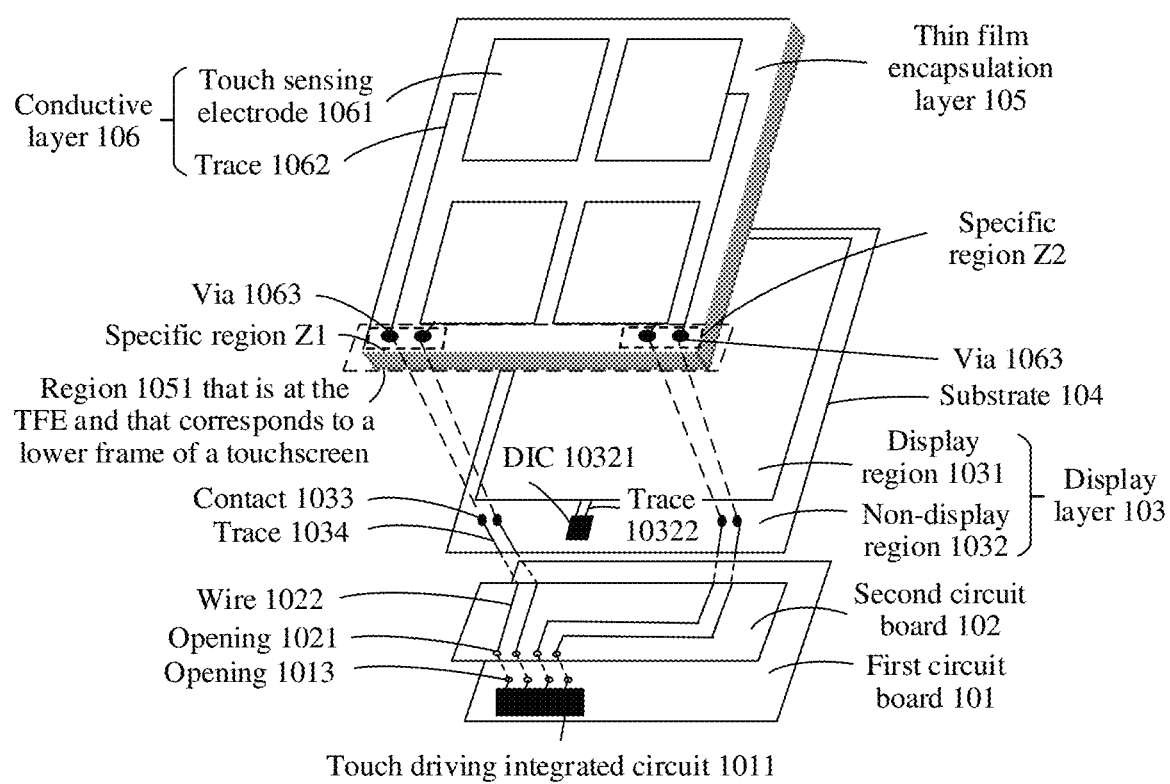
FIG. 3 is a schematic structural diagram of a touchscreen according to an embodiment.

FIG. 3 is a schematic structural diagram of a touchscreen for a narrow-frame electronic device according to an embodiment. As shown in FIG. 3, the touchscreen includes a first circuit board 101, a second circuit board 102, a display layer 103, a substrate 104, a thin film encapsulation layer 105, and a conductive layer 106.

The display layer 103 is disposed on the substrate 104, the thin film encapsulation layer 105 is disposed on the display layer 103, and the conductive layer 106 is disposed on the thin film encapsulation layer 105.

The display layer 103 may include a display region 1031 and a non-display region 1032. The display region 1031 of the display layer 103 includes a display unit. For example, the display unit is an organic light-emitting diode (OLED) display unit, and is configured to implement display of the touchscreen. A display driving integrated circuit 10321 may be disposed in the non-display region 1032 of the display layer 103. The display driving integrated circuit 10311 is coupled to the display region 1031 through a trace 10322. In this embodiment, the display unit is not limited to the OLED display unit, and may be alternatively another type of display unit, for example, a micro light-emitting diode (Micro LED) display unit. The non-display region 1032 is a part of the substrate.

In addition, in this embodiment, the display driving integrated circuit 10321 may be alternatively disposed at another location, for example, disposed on the first circuit board 101.

For the substrate 104, the display layer 103 may be deposited on the substrate 104. The substrate 104 may be a flexible substrate, for example, made of a flexible polymer material, so that the substrate may be bent to implement a flexible touchscreen. In addition, the substrate 104 may be alternatively a glass substrate. A material of the substrate is not limited.

The thin film encapsulation layer 105 is formed by alternately stacking at least one organic material layer and at least one inorganic material layer by using a thin film encapsulation technology. The thin film encapsulation layer 105 and the substrate 104 jointly encapsulate the display layer 103.

The thin film encapsulation layer 105, the substrate 104, and the display layer 103 form a display module.

Vias 1063 may be disposed in specific regions Z1 and Z2 at the thin film encapsulation layer 105. A contact 1033, for example, a silver paste point, is disposed in the non-display region 1032 of the display layer 103 to reduce impedance caused by contact. At the conductive layer 106, a touch sensing electrode 1061 is coupled to a trace 1062, and the trace 1062 is coupled to the contact 1033 in the non-display region 1032 of the display layer through the via 1063. The contact 1033 may be coupled to a touch driving integrated circuit 1011 through a trace 1034 and the second circuit board 102. Therefore, an electrical signal detected by the touch sensing electrode 1011 may be transmitted to the touch driving integrated circuit 1011 sequentially through the trace 1062, the via 1063, the contact 1033, the trace 1034, and the second circuit board 102. A touch driving signal output by the touch driving integrated circuit 1011 may also be transmitted to the touch sensing electrode 1061 sequentially through the second circuit board 102, the trace 1034, the contact 1033, the via 1063, and the trace 1062.

The conductive layer 106 includes the touch sensing electrode 1061 and the trace 1062 thereof. The touch sensing electrode 1061 is applicable to a mutual-capacitance touch sensing technology and/or a self-capacitance touch sensing technology. The touch sensing electrode 1061 is configured to detect a touch operation on the touchscreen.

The first circuit board 101 may be a flexible printed circuit. The first circuit board 101 may include the touch driving integrated circuit 1011, configured to process an electrical signal corresponding to a touch operation detected by the touch sensing electrode 1061. The processing includes analog front-end processing (for example, signal amplification, and level adjustment and control), analog-to-digital conversion (ADC), digital signal processing (DSP), and the like. In addition, the touch driving integrated circuit 1011 may further include a driving circuit of the touch sensing electrode 1061, configured to output a touch driving signal to drive the touch sensing electrode 1061, so that the touch sensing electrode 1061 forms a capacitor with a fixed capacitance value. When a user finger or another object is placed on the touchscreen, a capacitance value of the capacitor changes. A capacitance value variation of the capacitor may be used to determine a touch location on the touchscreen.

The first circuit board 101 further includes a solder joint 1012 and an opening 1013. The solder joint 1012 is configured to couple the touch driving integrated circuit 1011 to a wire on the first circuit board 101. For the solder joint 1012, refer to an example shown in FIG. 4.

The second circuit board 102 includes an opening 1021 and a wire 1022.

Figure 4:
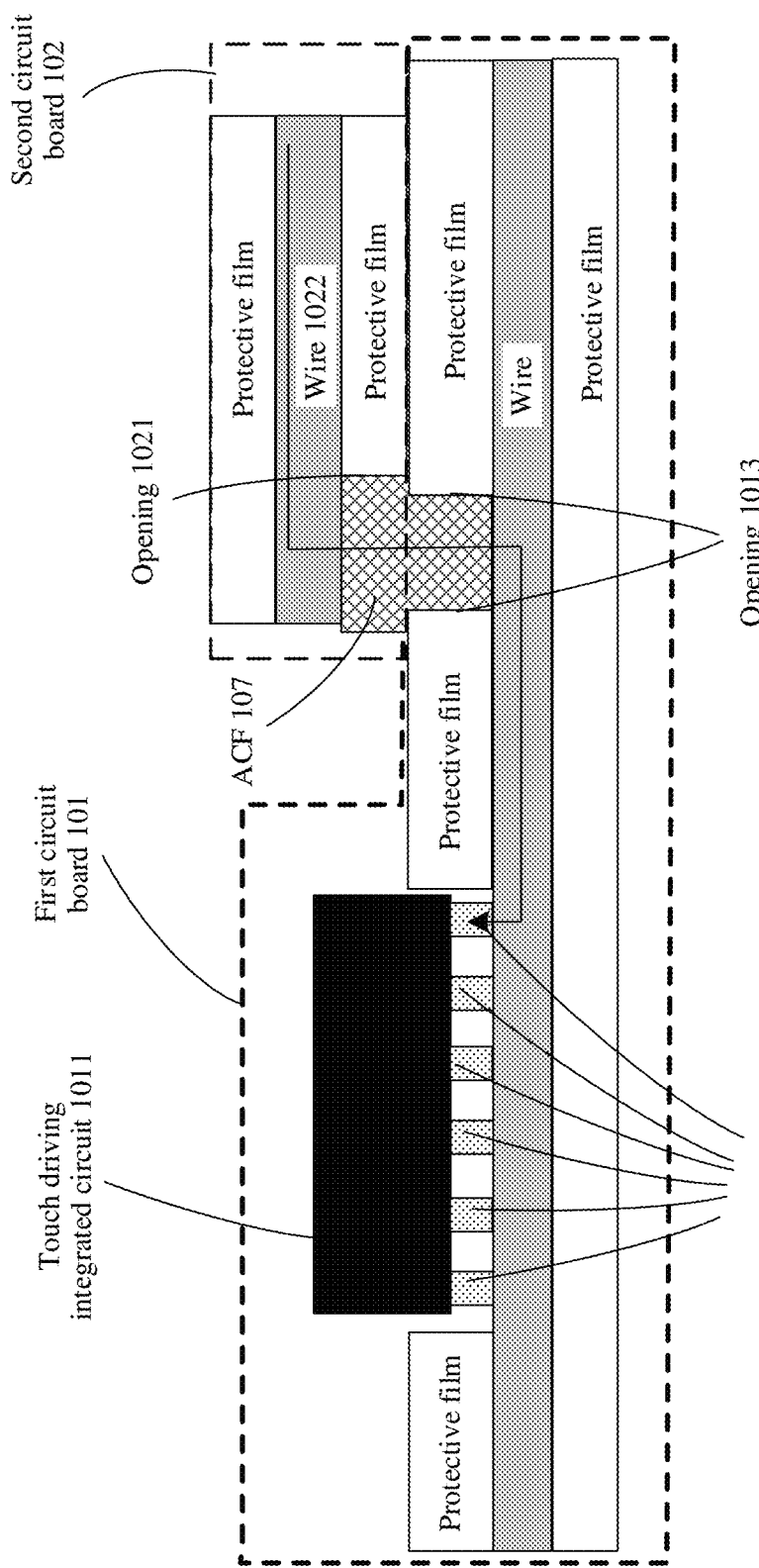
FIG. 4 is a schematic structural diagram of a connection between a first circuit board 101 and a second circuit board 102 according to an embodiment.

The wire 1022 on the second circuit board 102 couples the trace 1034 led out from the contact 1033 to the touch driving integrated circuit 1011 of the first circuit board 101. As shown in FIG. 3, the trace 1034 led out from the contact 1033 is coupled to the wire 1022 on the second circuit board 102. An end location of the wire 1022 on the second circuit board 102 includes the opening 1021 of a protective film. An opening 1013 is also disposed at a location that is on the first circuit board 101 and that corresponds to a location of the opening 1021. The wire on the second circuit board 102 is coupled to the touch driving integrated circuit 1011 through the opening 1021 on the second circuit board 102 and the opening 1013 on the first circuit board 101. The trace 1034 led out from the contact 1033 is coupled to the trace 1062 at the conductive layer 106 through the contact 1033 and the via 1063. The electrical signal detected by the touch sensing electrode 1061 at the conductive layer 106 is transmitted to the touch driving integrated circuit 1011 sequentially through the trace 1062, the via 1063, the contact 1033, the trace 1034, the wire 1022, the opening 1021, and the opening 1013. The touch driving signal output by the touch driving integrated circuit 1011 may also be transmitted to the touch sensing electrode 1061 sequentially through the opening 1013, the opening 1021, the wire 1022, the trace 1034, the contact 1033, the via 1063, and the trace 1062, to drive the touch sensing electrode. The following describes a connection structure of the first circuit board 101 and the second circuit board 102 in this embodiment. FIG. 4 is a schematic structural diagram of a connection between the first circuit board 101 and the second circuit board 102 according to an embodiment. As shown in FIG. 4, the first circuit board 101 includes the touch driving integrated circuit 1011, the touch driving integrated circuit 1011 is welded on the first circuit board 101 by using one or more solder joints 1012, and the touch driving integrated circuit 1011 is coupled to the wire on the first circuit board 101 through the solder joints 1012. Alternatively, the touch driving integrated circuit 1011 may be bonded to the first circuit board 101 by using an anisotropic conductive film (ACF), and coupled to the wire on the first circuit board 101.

The first circuit board 101 includes the wire that may be implemented by a copper layer. A surface of the first circuit board 101 further includes a protective film. The second circuit board 102 also includes the wire 1022 that may be implemented by a copper layer. A surface of the second circuit board 102 also includes a protective film. The protective film of the first circuit board 101 may include the opening 1013, and the protective film of the second circuit board 102 may also include the opening 1021. An ACF 107 may be included between the opening 1013 and the opening 1021, so that the wire on the first circuit board 101 is coupled to the wire 1022 on the second circuit board 102 through the ACF 107. Further, the wire 1022 on the second circuit board 102 is coupled to the solder joint 1012 on the first circuit board.

The protective films on the first circuit board 101 and the second circuit board 102 may be configured to shield signal interference caused by crossover of the wire on the first circuit board 101 and the wire on the second circuit board 102.

In this embodiment, the first circuit board 101 and the second circuit board 102 are bonded by using the ACF 107, or may be welded by using solder. In this embodiment, the wire 1022 on the second circuit board 102 shown in FIG. 4 may be any wire on the second circuit board 102, and a manner of connecting another wire to the touch driving integrated circuit 1011 is similar.

As shown in FIG. 3 and FIG. 4, there may be at least two vias 1063. Each trace 1062 corresponds to one via 1063 at the thin film encapsulation layer 105. The at least two vias 1063 may be dispersedly disposed in specific regions at the thin film encapsulation layer 105, for example, dispersedly disposed in the specific region Z1 and the specific region Z2. The specific region Z1 and the specific region Z2 may be regions that are at the thin film encapsulation layer 105 and that correspond to a frame of the touchscreen, for example, regions that are at the thin film encapsulation layer 105 and that correspond to a lower frame of the touchscreen.

The specific region Z1 and the specific region Z2 may be disposed near an edge of the thin film encapsulation layer 105 (for example, an edge, of the thin film encapsulation layer 105, that corresponds to the lower frame of the touchscreen) as close as possible.

The at least two vias 1063 are dispersedly disposed in the specific regions Z1 and Z2 at the thin film encapsulation layer 105, and the specific regions Z1 and Z2 are provided as the edge, of the thin film encapsulation layer 105, that corresponds to the lower frame of the touchscreen. In this way, when the thin film encapsulation layer 105 at which the vias 1063 are dispersedly disposed is assembled to the touchscreen, a width of a frame of the touchscreen can be reduced, thereby increasing a screen-to-body ratio.

The second circuit board 102 is disposed in the connection structure of the first circuit board 101 and the second circuit board 102 shown in FIG. 3 and FIG. 4. The trace 1062 at the conductive layer 106 is coupled to the touch driving integrated circuit 1011 through the wire 1022 on the second circuit board 102, to drive and perform detection for the conductive layer 106, without adding a wire on the first circuit board 101 for coupling to the trace 1062 at the conductive layer 106, thereby reducing wire crossover on the first circuit board 101, and reducing interference caused by wire crossover. In addition, a quantity of layers of the first circuit board 101 can be reduced, thereby reducing process difficulty and costs.

Figure 5:
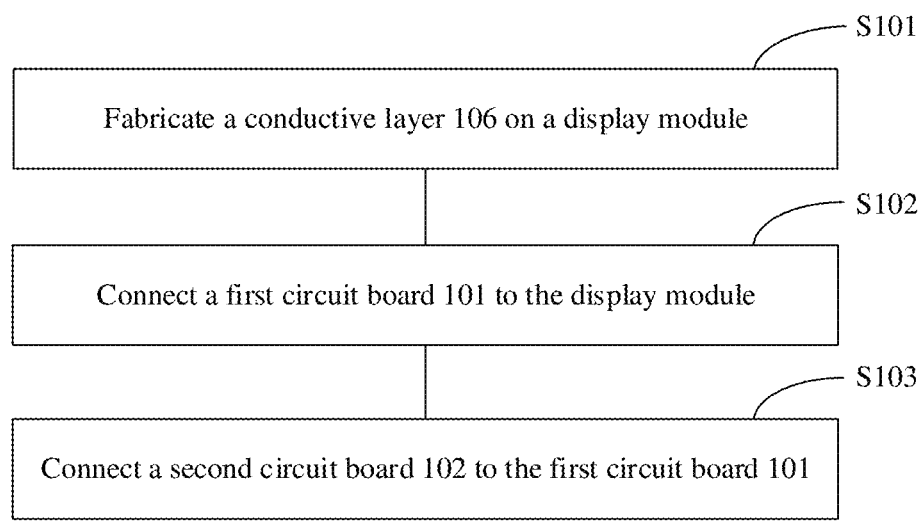
FIG. 5 is a flowchart of a process flow of a touchscreen according to an embodiment.

The following describes a process flow of the touchscreen including the first circuit board 101 and the second circuit board 102 in this embodiment. FIG. 5 is a flowchart of a process flow of a touchscreen according to an embodiment. The process flow includes steps S101 to S103.

S101. Fabricate the conductive layer 106 on the display module.

In this embodiment, the display unit in the display module may be an active matrix OLED (, AMOLED) display unit or an OLED display unit, or may be a micro LED display unit, or may be another display module or a new display unit in the future. This is not limited in this embodiment. A process flow of fabricating the display module is not limited in this embodiment. Refer to a process flow of fabricating a display module in the conventional technology.

Figures 6A, 6B:
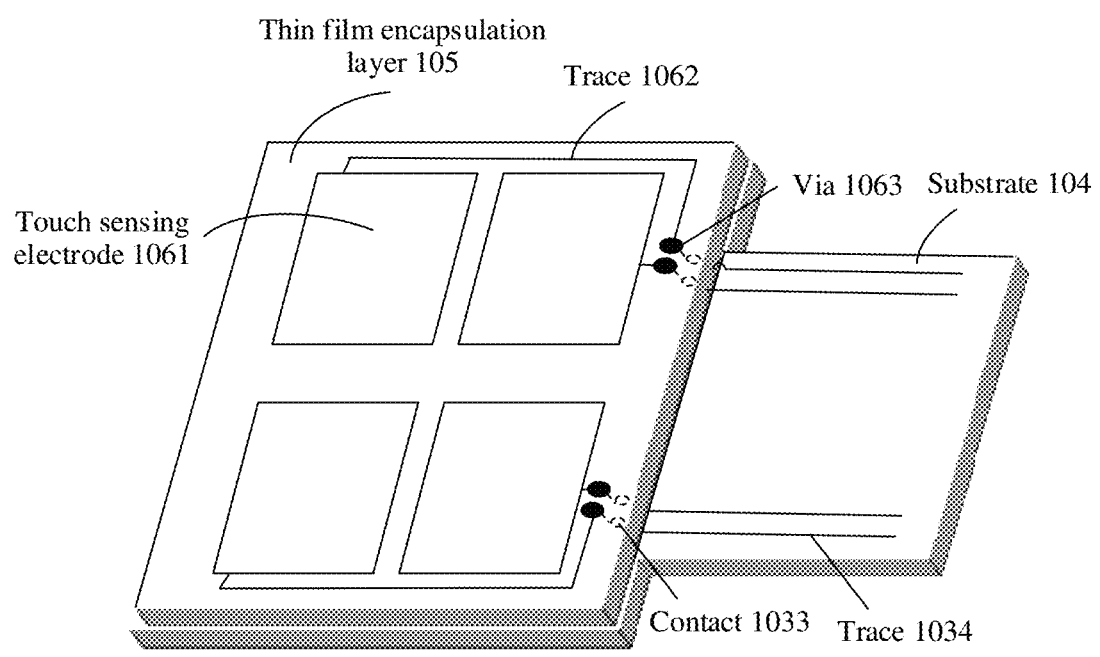
FIG. 6(a) is a schematic structural diagram of a process flow of a touchscreen according to an embodiment.
FIG. 6(b) is another schematic structural diagram of a process flow of a touchscreen according to an embodiment.
Figure 6C:
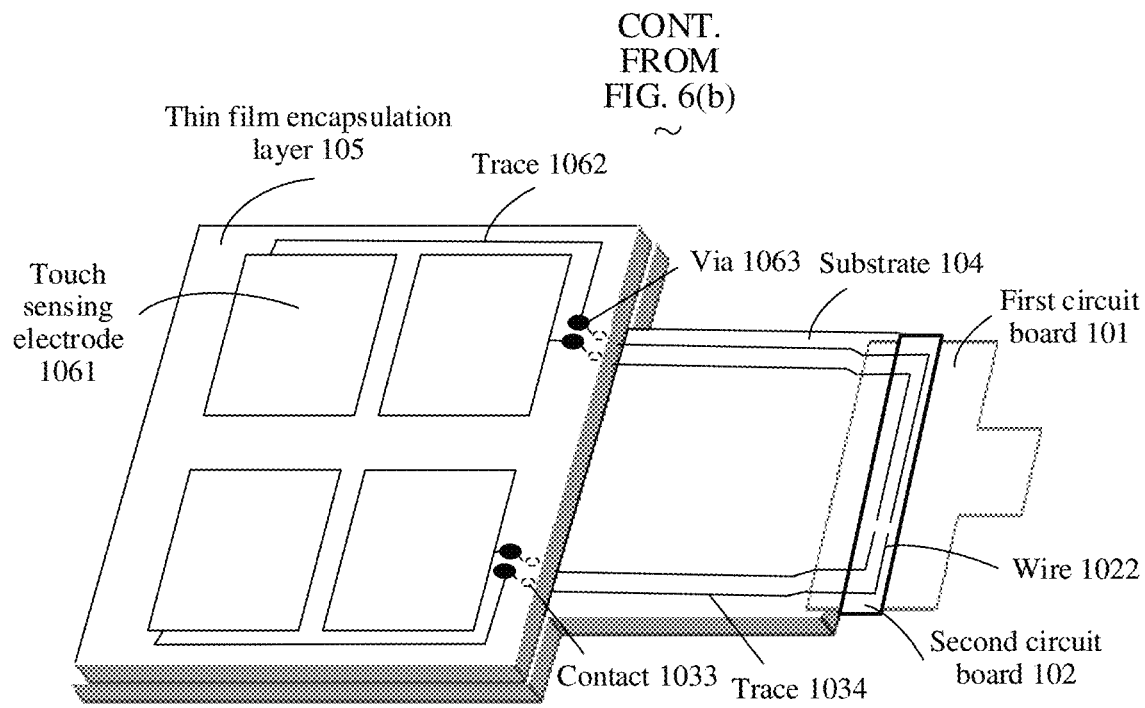
FIG. 6(c) is another schematic structural diagram of a process flow of a touchscreen according to an embodiment.

The display module includes the thin film encapsulation layer 105, the substrate 104, and the display layer 103. FIG. 6(a) to FIG. 6(c) are a schematic structural diagram of a process flow of a touchscreen according to an embodiment. As shown in FIG. 6(a), after the display module is fabricated, the conductive layer 106 may be fabricated on the thin film encapsulation layer 105, including fabricating the touch sensing electrode 1061 and the trace 1062. The conductive layer 106 may be fabricated by using a printing process. Alternatively, in another implementation, the conductive layer 106 may be implemented by using an out-cell touch technology. The conductive layer 106 is an independent layer, and the conductive layer 106 is bonded to the display module. Alternatively, the conductive layer 106 may be implemented by using an in-cell touch technology. The conductive layer 106 may be embedded in the display module for implementation.

As shown in FIG. 6(a), the fabricating the conductive layer 106 on the display module further includes coupling the trace 1062 at the conductive layer 106 to the contact 1033 in the non-display region at the display layer 103 through the via 1063, and then routing the trace 1034 on the substrate 104 and coupling the trace 1034 to the contact 1033.

S102. Connect the first circuit board 101 to the display module.

In this embodiment, the first circuit board 101 may be connected to the display module through bonding or through welding by using solder. For example, the first circuit board 101 is connected to the substrate 104. For example, bonding may be performed by using an ACF, and the solder may be soldering tin or silver paste. As shown in FIG. 6(b), after the first circuit board 101 is connected to the display module, a chip on the first circuit board 101 is connected to the display module. A process flow of connecting the first circuit board 101 to the display module is not limited. Refer to a process flow of connecting an FPC to a display module in the conventional technology.

S103. Connect the second circuit board 102 to the first circuit board 101.

In this embodiment, the second circuit board 102 may also be connected to the first circuit board 101 through bonding or through welding by using solder.

As shown in FIG. 6(c), after the second circuit board 102 is connected to the first circuit board 101, the wire 1022 on the second circuit board 102 may be coupled to the touch driving integrated circuit 1011 through the ACF 107 and the wire on the first circuit board 101. After the second circuit board 102 is connected to the first circuit board 101, the trace 1034 led out from the contact 1033 is coupled to the wire 1022 on the second circuit board 102, so that the trace 1062 at the conductive layer 106 is coupled to the touch driving integrated circuit 1011 sequentially through the via 1063, the contact 1033, the trace 1034, the wire 1022 on the second circuit board 102, the ACF 107, and the wire on the first circuit board 101.

Figure 7:
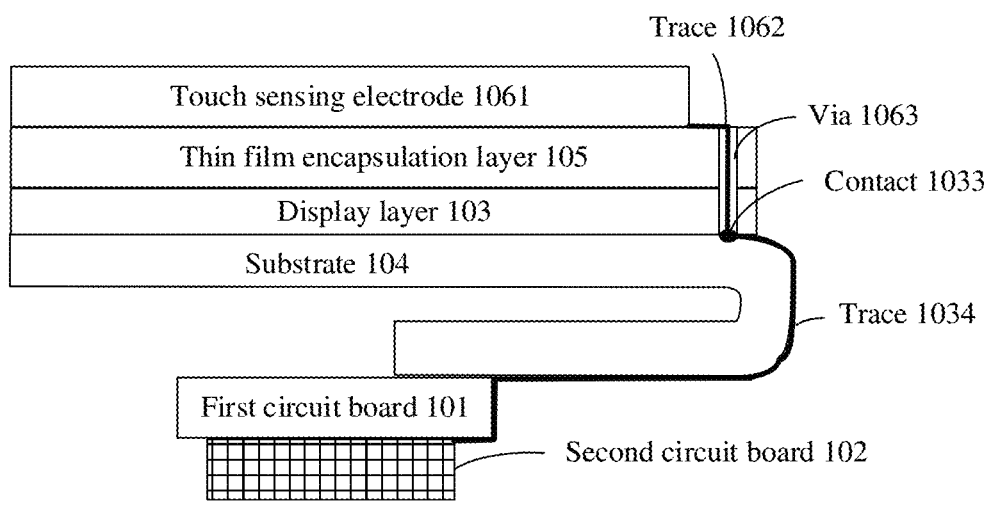
FIG. 7 is a schematic structural diagram of a touchscreen according to an embodiment.

In the touchscreen structure shown in FIG. 6(*a*) to FIG. 6(*c*), the substrate 104 may be flexible. FIG. 7 may be a schematic structural diagram of a touchscreen according to an embodiment. As shown in FIG. 7, when the touchscreen is mounted on an electronic device, the substrate 104 may be bent, folded, or folded by 180°, to implement a very narrow lower frame of the touchscreen. Alternatively, a bending part may be at a location of the touchscreen other than the lower frame, for example, an upper frame. In this case, a very narrow upper frame can be implemented.

In this embodiment, the flowchart of the process flow of the touchscreen shown in FIG. 5 may further include other steps.

A shape of the second circuit board 102 and a location of the second circuit board 102 on the first circuit board 101 are not limited. After a location of the touch driving integrated circuit 1011 on the first circuit board 101 and a wire of the touch driving integrated circuit 1011 on the first circuit board 101 are determined, the shape of the second circuit board 102 and the location of the second circuit board 102 on the first circuit board 101 may be determined. The shape and the location of the second circuit board 102 may enable the trace 1034 led out from the contact 1033 to be coupled to the second circuit board 102 through the first circuit board 101, and then coupled to the touch driving integrated circuit 1011 through the wire 1022 on the second circuit board 102. Alternatively, the shape and the location of the second circuit board 102 may enable the trace 1034 led out from the contact 1033 to be directly coupled to the second circuit board 102 without using the first circuit board 101, and then coupled to the touch driving integrated circuit 1011 through the wire 1022 on the second circuit board 102. The following separately provides descriptions.

Figure 8:
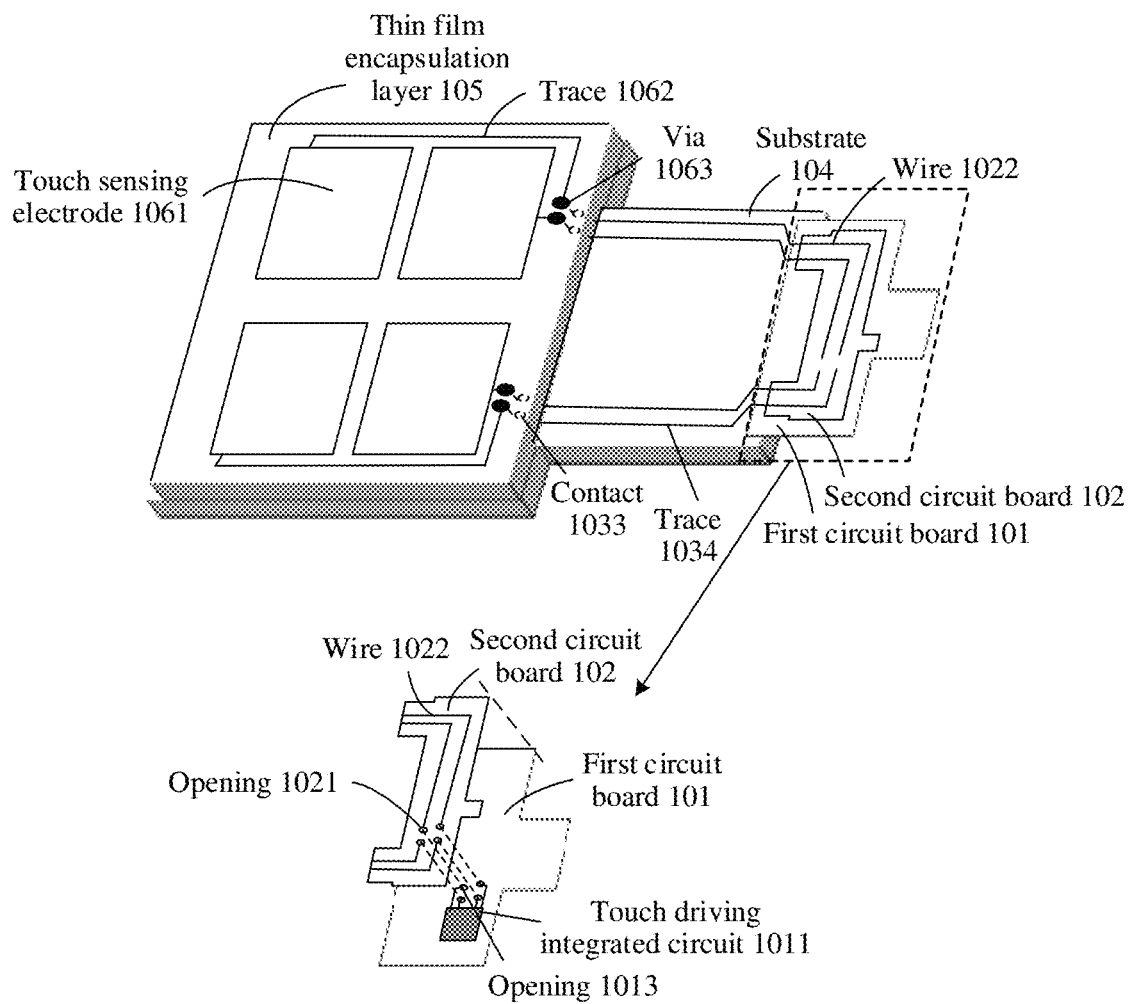
FIG. 8 is a schematic structural diagram of a touchscreen according to an embodiment.

FIG. 8 is a schematic structural diagram of a touchscreen according to an embodiment. As shown in FIG. 8, the trace 1034 led out from the contact 1033 may be coupled to the second circuit board 102 through the first circuit board 101. The trace 1034 led out from the contact 1033 may be bonded to the substrate 104 by using an ACF. Then the trace 1034 may also be bonded to the first circuit board 101 by using an ACF, and coupled to the second circuit board 102 through the first circuit board 101. The trace 1034 may also be coupled to the second circuit board 102 through bonding by using an ACE As shown in FIG. 8, the first circuit board 101 includes the wire and the touch driving integrated circuit 1011. If a wire between the trace 1034 led out from the contact 1033 and the touch driving integrated circuit 1011 is directly routed on the first circuit board 101, the wire crosses over other wires on the first circuit board 101. To reduce wire crossover on the first circuit board 101, as shown in FIG. 8, the trace 1034 led out from the contact 1033 is coupled to the wire 1022 on the second circuit board 102. The end location of the wire 1022 on the second circuit board 102 includes the opening 1021 of the protective film. The opening 1013 is also disposed at the location that is on the first circuit board 101 and that corresponds to the location of the opening 1021. The wire 1022 on the second circuit board 102 is coupled to the touch driving integrated circuit 1011 through the opening 1021 on the second circuit board 102. After the first circuit board 101 and the second circuit board 102 are bonded by using the ACF, the wire 1022 on the second circuit board 102 is coupled to the touch driving integrated circuit 1011 through the opening 1021, the ACF 107, the opening 1013, and the wire on the first circuit board 101. Further, the trace 1062 at the conductive layer 106 is coupled to the touch driving integrated circuit 1011 through the via 1063, the contact 1033, the trace 1034, the wire 1022 on the second circuit board 102, and the wire on the first circuit board 101.

When the trace 1034 led out from the contact 1033 is routed on the first circuit board 101, the trace 1034 may be routed along an edge of the first circuit board 101, without crossing over the wire on the first circuit board 101.

As shown in FIG. 8, there are at least two contacts 1033. Each of at least two traces 1062 corresponds to one contact 1033 on the substrate 104. Each of the at least two contacts 1033 corresponds to one trace 1034 on the substrate. There are at least two traces 1034.

In the schematic structural diagram of the touchscreen shown in FIG. 8, the second circuit board 102 is disposed, so that the trace 1062 at the conductive layer 106 is coupled to the touch driving integrated circuit 1011 through the wire 1022 on the second circuit board 102, to drive and perform detection for the conductive layer 106, without adding a wire on the first circuit board 101 for coupling to the trace 1062 at the conductive layer 106, thereby reducing wire crossover on the first circuit board 101, and reducing interference caused by wire crossover. In addition, a quantity of layers of the first circuit board 101 can be reduced, thereby reducing process difficulty and costs.

In addition, shapes of the opening 1013, the opening 1021, and the second circuit board 102 are not limited.

In this embodiment, when the touchscreen structure shown in FIG. 8 is mounted on an electronic device, the touchscreen structure can be folded in the manner shown in FIG. 7.

Figure 9A:
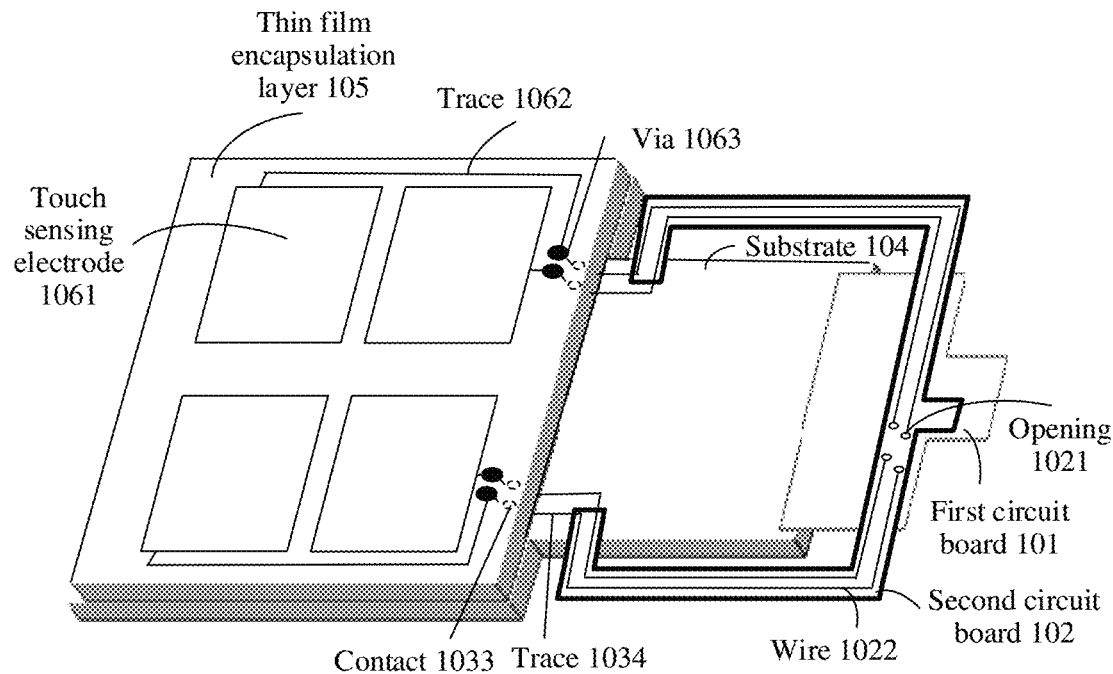
FIG. 9A is a schematic structural diagram of a touchscreen according to an embodiment.

FIG. 9A may be a schematic structural diagram of a touchscreen according to an embodiment. As shown in FIG. 9A, the trace 1034 led out from the contact 1033 may be alternatively directly coupled to the second circuit board 102 without using the first circuit board 101. The trace 1034 led out from the contact 1033 may be bonded to the substrate 104 by using an ACF. Then the trace 1034 is coupled to the second circuit board 102. The trace 1034 may also be coupled to the second circuit board 102 through bonding by using an ACF. The trace 1034 led out from the contact 1033 is coupled to the wire 1022 on the second circuit board 102. The end location of the wire 1022 on the second circuit board 102 includes the opening 1021 of the protective film. The opening 1013 is also disposed at the location that is on the first circuit board 101 and that corresponds to the location of the opening 1021. The wire 1022 on the second circuit board 102 is coupled to the touch driving integrated circuit 1011 through the opening 1013 on the second circuit board 102.

The second circuit board 102 may be bonded to the first circuit board 101 by using an ACF, and the second circuit board 102 may be bonded to the substrate 104 by using an ACE After the first circuit board 101 and the second circuit board 102 are bonded by using the ACF, the wire 1022 on the second circuit board 102 is coupled to the touch driving integrated circuit 1011 through the opening 1021, the ACF 107, the opening on the first circuit board 101, and the wire on the first circuit board 101. After the first circuit board 101 and the substrate 104 are bonded by using the ACF, the trace

1062 at the conductive layer 106 is coupled to the wire 1022 on the second circuit board 102 through the via 1063, the contact 1033, and the trace 1034. Further, the trace 1062 at the conductive layer 106 is coupled to the touch driving integrated circuit 1011 through the via 1063, the contact 1033, the trace 1034, the wire 1022 on the second circuit board 102, and the wire on the first circuit board 101.

For structures such as the opening 1013 and the wire on the first circuit board 101, refer to the descriptions in the example shown in FIG. 8. Details are not described herein again.

Figure 9B:
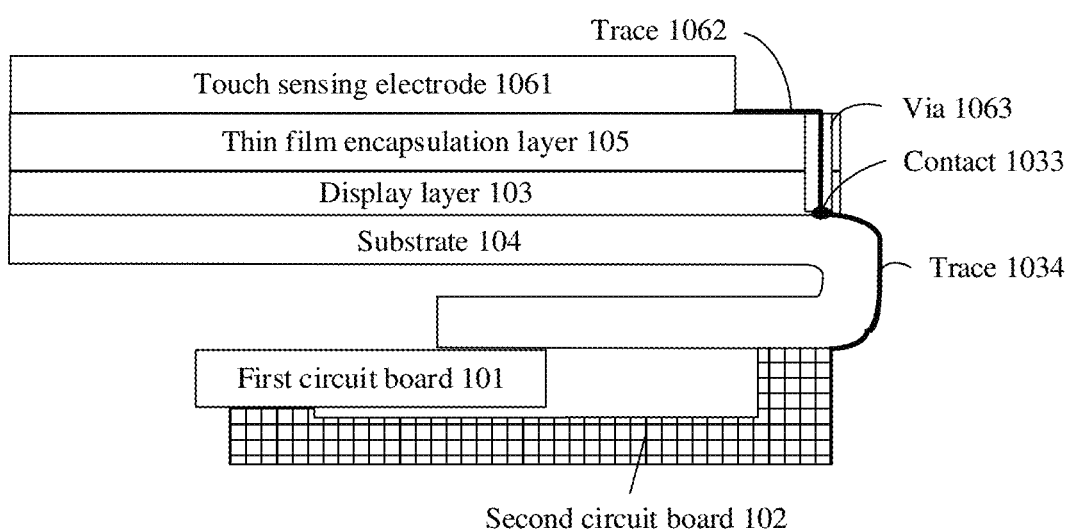
FIG. 9B is a schematic structural diagram of a touchscreen according to an embodiment.

In this embodiment, when the touchscreen structure shown in FIG. 9A is mounted on an electronic device, the touchscreen structure may be bent, folded, or folded by 180°. FIG. 9B is a schematic structural diagram of a touchscreen according to an embodiment. As shown in FIG. 9B, the substrate 104 may be bent, folded, or folded by 180°, to implement a very narrow lower frame of the touchscreen. Alternatively, a bending part may be at a location of the touchscreen other than the lower frame, for example, an upper frame. In this case, a very narrow upper frame can be implemented.

Figure 10A:
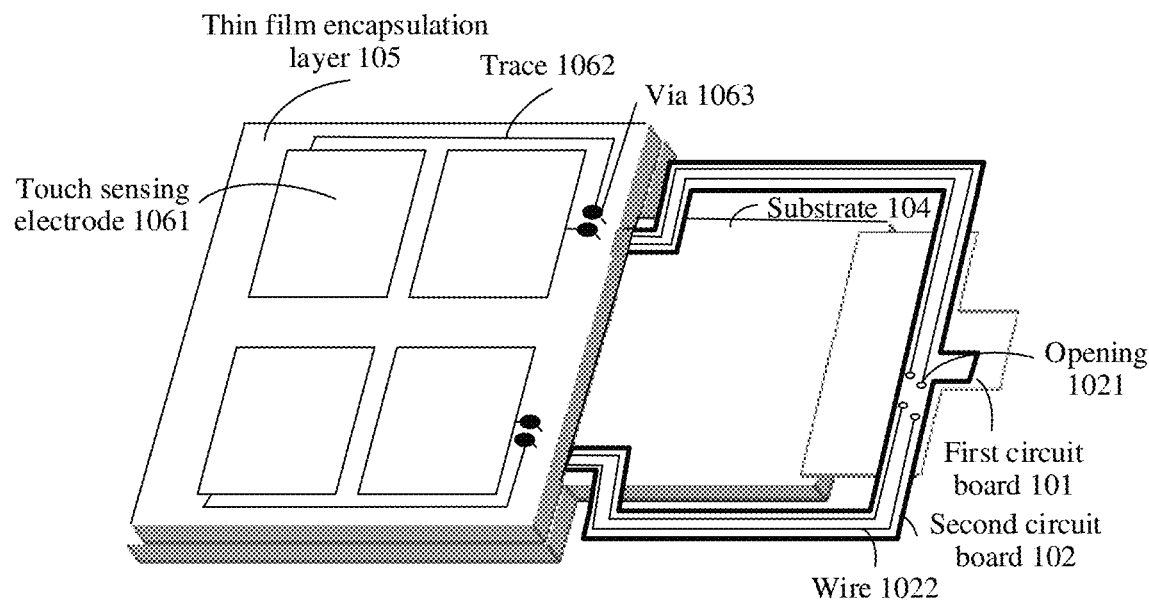
FIG. 10A is a schematic structural diagram of a touchscreen according to an embodiment.

FIG. 10A may be a schematic structural diagram of a touchscreen according to an embodiment. As shown in FIG. 10A, the trace 1062 is directly coupled to a first end of a wire on the second circuit board 102 through the via 1063. The trace 1062 may be alternatively directly coupled to the second circuit board 102 without using the substrate 104. The trace 1062 may be bonded to the second circuit board 102 by using an ACE Then the trace 1062 is coupled to the wire on the first circuit board 101 through the wire 1022 on the second circuit board 102 and the opening 1021 on the second circuit board. Then the wire on the first circuit board 101 is coupled to the touch driving integrated circuit 1011. The trace 1062 may also be coupled to the second circuit board 102 through bonding by using an ACE The second circuit board 102 may be bonded to the first circuit board 101 by using an ACF. After the first circuit board 101 and the second circuit board 102 are bonded by using the ACF, the wire 1022 on the second circuit board 102 is coupled to the touch driving integrated circuit 1011 through the opening 1021, the ACF 107, the opening on the first circuit board 101, and the wire on the first circuit board 101. Further, the trace 1062 at the conductive layer 106 is coupled to the touch driving integrated circuit 1011 through the via 1063, the wire 1022 on the second circuit board 102, and the wire on the first circuit board 101.

For structures such as the opening 1013 and the wire on the first circuit board 101, refer to the descriptions in the example shown in FIG. 8. Details are not described herein again.

Figure 10B:
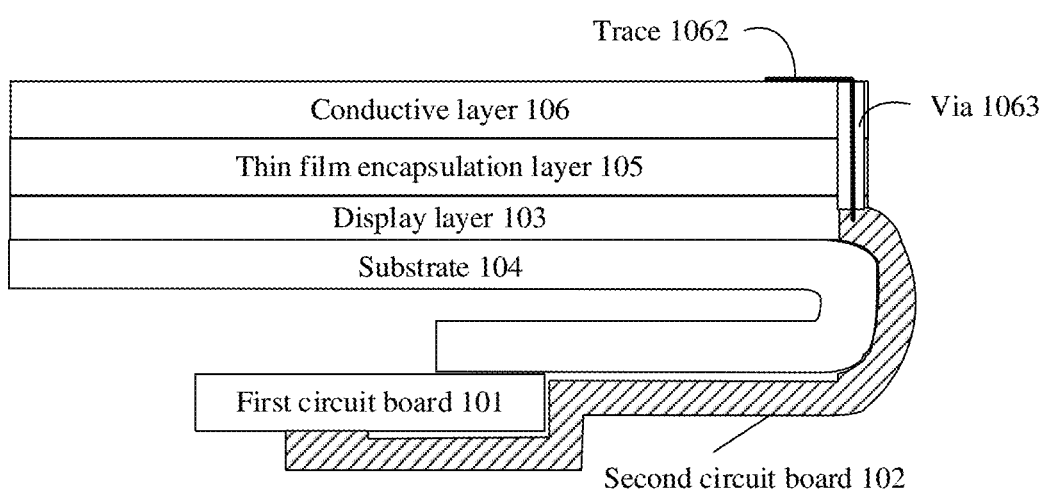
FIG. 10B is a schematic structural diagram of a touchscreen according to an embodiment.

In this embodiment, when the touchscreen structure shown in FIG. 10A is mounted on an electronic device, the touchscreen structure may be bent, folded, or folded by 180°. FIG. 10B is a schematic structural diagram of a touchscreen according to an embodiment. As shown in FIG. 10B, the substrate 104 and the second circuit board 102 may be bent, folded, or folded by 180°, to implement a very narrow lower frame of the touchscreen. Alternatively, a bending part may be at a location of the touchscreen other than the lower frame, for example, an upper frame. In this case, a very narrow upper frame can be implemented.

Figure 11:
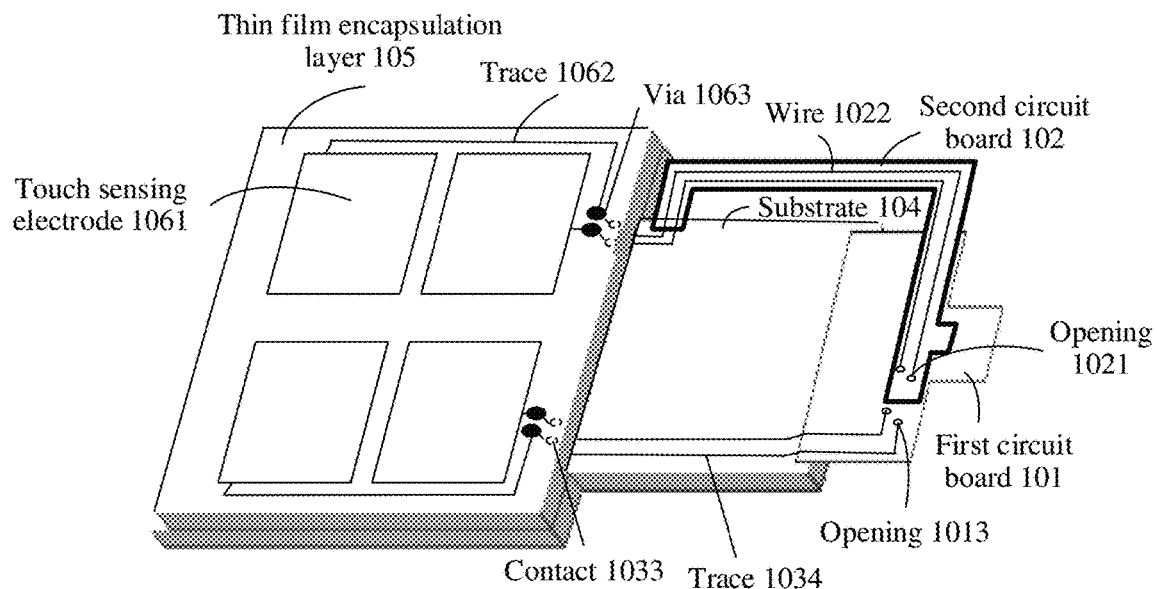
FIG. 11 is a schematic structural diagram of a touchscreen according to an embodiment.

FIG. 11 may be a schematic structural diagram of a touchscreen according to an embodiment. As shown in FIG. 11, traces 1034 led out from contacts 1033 may be further classified into two parts. One part of traces 1034 led out from contacts 1033 are coupled to a second circuit board 102 through a substrate 104, and then are coupled to wires on a first circuit board 101 through wires on the second circuit board 102 and openings 1021 on the second circuit board. Then the wires on the first circuit board 101 are coupled to a touch driving integrated circuit 1011. The other part of traces 1034 led out from contacts 1033 are coupled to wires on the first circuit board 101 through the substrate 104, the first circuit board 101, and openings 1021 on the first circuit board 101. Then the wires on the first circuit board 101 are coupled to the touch driving integrated circuit 1011.

In this embodiment, when the touchscreen structure shown in FIG. 11 is mounted on an electronic device, the touchscreen structure can be folded or bent. For the folded or bent touchscreen structure, refer to FIG. 9B.

Figure 12:
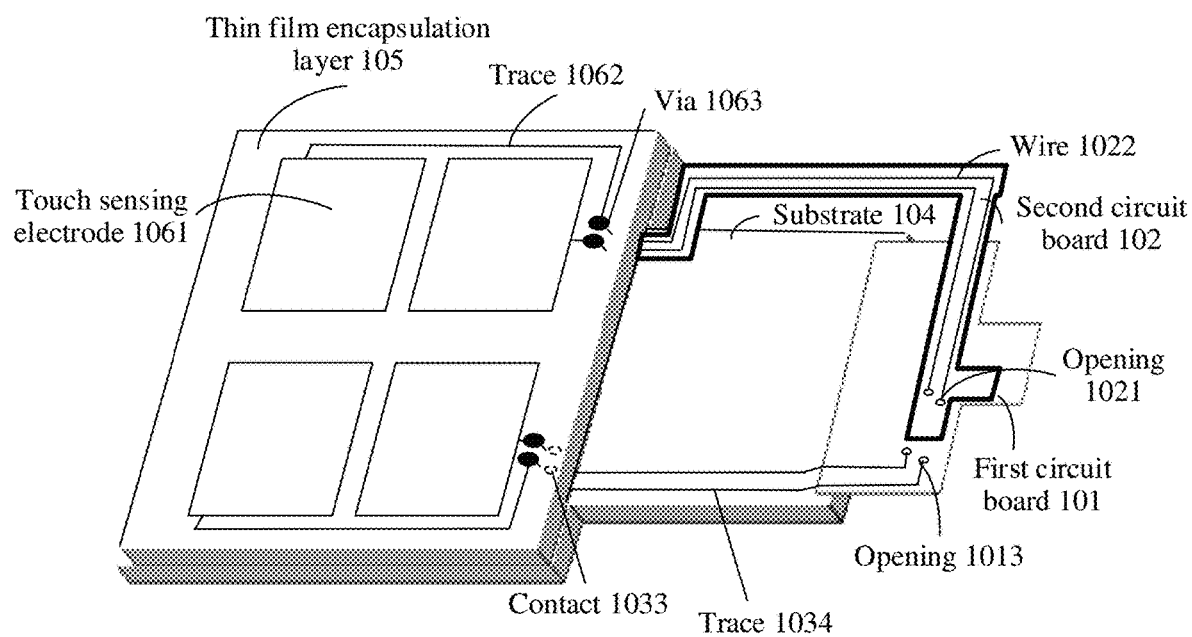
FIG. 12 is a schematic structural diagram of a touchscreen according to an embodiment.

FIG. 12 may be a schematic structural diagram of a touchscreen according to an embodiment. As shown in FIG. 12, traces 1062 are classified into two parts. One part of traces 1062 each are directly coupled to a first end of one wire on a second circuit board 102 through a via 1063. To This part of traces 1062 are coupled to wires on a first circuit board 101 through vias 1063, wires on the second circuit board 102, and openings 1021 on the second circuit board. Then the wires on the first circuit board 101 are coupled to a touch driving integrated circuit 1011. The other part of traces 1062 are coupled to wires on the first circuit board 101 through vias 1063, contacts 1033, traces 1034, the first circuit board 101, and openings 1021 on the first circuit board 101. Then the wires on the first circuit board 101 are coupled to the touch driving integrated circuit 1011.

In this embodiment, when the touchscreen structure shown in FIG. 12 is mounted on an electronic device, the touchscreen structure can be folded or bent. For the folded or bent touchscreen structure, refer to FIG. 10B.

As shown in FIG. 12, a quantity of contacts 1033 is less than that of traces 1062. Each contact 1033 corresponds to one trace 1034 on the substrate 104.

When the trace 1034 coupled to the trace 1062 shown in FIG. 11 and FIG. 12 is routed on the first circuit board 101, the trace 1034 does not cross over other wires on the first circuit board 101, and a quantity of layers of the first circuit board 101 does not need to be increased for the trace 1034.

In the embodiments, as shown in FIG. 11 and FIG. 12, the traces 1062 at the conductive layer 106 are classified into two parts and led out from the vias 1063. However, the traces 1062 may be alternatively classified into more parts. As shown in FIG. 11, among a plurality of parts of traces into which the traces 1062 at the conductive layer 106 are classified, one or more parts of traces 1062 may be coupled to wires on the first circuit board 101 through vias 1063, contacts 1033, traces 1034, wires 1022 on the second circuit board 102, and openings 1021 on the second circuit board, and then the wires on the first circuit board 101 are coupled to the touch driving integrated circuit 1011; the other one or more parts of traces 1062 are coupled to wires on the first circuit board 101 through vias 1063, contacts 1033, traces 1034, the first circuit board 101, and openings 1021 on the first circuit board 101, and then the wires on the first circuit board 101 are coupled to the touch driving integrated circuit 1011. As shown in FIG. 12, among a plurality of parts of traces 1062 obtained through classification, one or more parts of traces 1062 may be coupled to wires on the first circuit board 101 through vias 1063, wires on the second circuit board 102, and openings 1021 on the second circuit board, and then the wires on the first circuit board 101 are coupled to the touch driving integrated circuit 1011; the other one or more parts of traces 1062 are coupled to wires on the first circuit board 101 through vias 1063, contacts 1033, traces 1034, the first circuit board 101, and openings 1021 on the first circuit board 101, and then the wires on the first circuit board 101 are coupled to the touch driving integrated circuit 1011. In addition, when the traces 1062 at the conductive layer 106 are classified into a plurality of parts, in addition to the distribution shown in FIG. 11 and FIG. 12, a third or fourth part of traces may be alternatively routed in other manners. For example, the traces 1062 at the conductive layer 106 are classified into three parts. Two parts of traces 1062 are routed in the manner shown in FIG. 11, and a third part of traces 1062 (as shown in FIG. 12) are coupled to the touch driving integrated circuit 1011 through vias 1063, wires on the second circuit board 102, openings 1021 on the second circuit board, and wires on the first circuit board 101.

In this embodiment, in FIG. 3, FIG. 6(a) to FIG. 6(c), and FIG. 8 to FIG. 12, an example in which the conductive layer 106 includes four traces 1062 and the TFE 105 includes four vias is used for description. Each trace 1062 corresponds to one via 1063 on the TFE 105. The trace 1062 is coupled to the trace 1034 through the corresponding via 1063, or is coupled to the wire 1022 on the second circuit board 102 through the corresponding via 1063. It may be understood that the conductive layer 106 is not limited to including four traces 1062, and may alternatively include more or fewer traces, and there may also be more or fewer corresponding vias.

In this embodiment, a quantity of traces 1062 is N, and N is greater than or equal to 2. Among the N traces 1062, a second end of each of M traces 1062 is coupled to a first end of one wire 1022 on the second circuit board 102 through the display module. In this case, there are also M wires 1022 on the second circuit board 102.

In this embodiment, there may be a plurality of first traces, and the first traces and vias may be in a one-to-one correspondence, that is, one first trace corresponds to one via.

In some embodiments, the vias and contacts are also in a one-to-one correspondence, that is, one via corresponds to one contact. Examples are shown in FIG. 3, FIG. 6(a) to FIG. 6(c), FIG. 8, FIG. 9A, and FIG. 11.

In some other embodiments, some or all vias may have no corresponding contacts, for example, in a scenario in which a second end of a first trace is directly coupled to a first end of one wire on the second circuit board through a corresponding via. In the example shown in FIG. 10A, none of vias has a corresponding contact. In the example shown in FIG. 12, some vias have no corresponding contacts.

The contacts and second traces may be in a one-to-one correspondence, that is, one contact corresponds to one second trace.

In the examples shown in FIG. 3, FIG. 6(a) to FIG. 6(c), FIG. 8, and FIG. 9A, a quantity of traces 1062 may be the same as a quantity of vias 1063, a quantity of contacts 1033 on the substrate 104, and a quantity of traces 1034. For example, all the quantities are N, that is, M=N. In the examples shown in FIG. 3, FIG. 6(a) to FIG. 6(c), FIG. 8, and FIG. 9A, a quantity of traces 1062 is also the same as a quantity of wires 1022 on the second circuit board 102, and is N. In the example shown in FIG. 10A, a quantity of traces 1062 may be the same as a quantity of vias 1063 and a quantity of wires 1022, and is N. A quantity of traces 1062 and a quantity of wires 1022 on the second circuit board 102 are not limited to 4 shown in the figure, and may be alternatively greater than or less than 4. In the examples shown in FIG. 11 and FIG. 12, a quantity of wires 1022 on the second circuit board 102 is not limited to 4 shown in the figure, and may be alternatively greater than or less than 4.

In the example shown in FIG. 11, a quantity of traces 1062 is still the same as a quantity of vias 1063, a quantity of contacts 1033 on the substrate 104, and a quantity of traces 1034. For example, all the quantities are N, for example, 4. However, only the second end of each of the M (for example, two) traces 1062 is coupled to a first end of one wire 1022 on the second circuit board 102 through the display module. A second end of each of remaining (N-M) traces 1062 is coupled to the touch driving integrated circuit 1011 through the via 1063, the contact 1033, the second trace 1034 corresponding to the contact 1033, the first circuit board 101, and the first opening 1013.

In the example shown in FIG. 12, a quantity of traces 1062 is still the same as a quantity of vias 1063. For example, both quantities are N, for example, 4. However, only the second end of each of the M (for example, two) traces 1062 is directly coupled to a first end of one wire 1022 on the second circuit board 102 through a corresponding via 1063. A second end of each of remaining (N-M) (for example, remaining two) traces 1062 is coupled to the touch driving integrated circuit 1011 through the via 1063, the contact 1033, the second trace 1034 corresponding to the contact 1033, the first circuit board 101, and the first opening 1013.

In another embodiment, a quantity of traces 1062 may still be the same as a quantity of vias 1063. For example, both quantities are N, for example, 4. Among the M (for example, three) traces 1062, a second end of each of S (for example, two, that is, two out of three) traces 1062 is directly coupled to a first end of one wire 1022 on the second circuit board 102 through a corresponding via 1063. A second end of a trace 1063 other than the S traces 1062 is coupled to a first end of one wire 1022 on the second circuit board 102 through the via 1063, the contact 1033, and the trace 1034 corresponding to the contact. A second end of (N-M) (for example, one) traces 1062 other than the M (for example, three) traces in the N (for example, four) traces 1062 is coupled to the touch driving integrated circuit 1011 through the via 1063, the contact 1033, the trace 1034 corresponding to the contact, the first circuit board 101, and the opening 1013.

In this embodiment, the trace 1062 is the first trace, the trace 1034 is the second trace, the opening 1021 is the second opening, and the opening 1013 is the first opening. For each first trace 1062, an end coupled to the touch sensing electrode 1061 is a first end, and an end coupled to a contact 1033 or a first end of a wire 1022 on the second circuit board 102 is a second end. For each second trace 1034, an end coupled to a contact 1033 or a second end of a first trace 1062 is a first end, and an end coupled to a first end of a wire 1022 on the second circuit board 102 or an opening 1013 on the first circuit board 101 is a second end. For a wire 1022 on the second circuit board 102, an end coupled to a second end of a second trace 1034 or a second end of a first trace 1062 is a first end, and an end coupled to a second opening 1021 on the second circuit board 102 is a second end.

Figure 13:
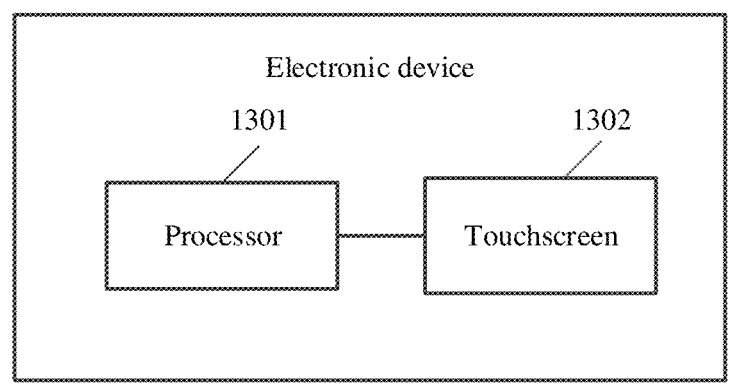
FIG. 13 is a schematic structural diagram of an electronic device according to an embodiment.

In addition, an embodiment may further provide an electronic device. The electronic device includes the touchscreen described in any one of FIG. 3 and FIG. 7 to FIG. 12. FIG. 13 is a schematic structural diagram of an electronic device according to an embodiment. As shown in FIG. 13, the electronic device includes a processor 1301 and a touchscreen 1302.

The processor 1301 may be one or more CPUs. When the processor 1301 is one CPU, the CPU may be a single-core CPU or a multi-core CPU.

The processor 1301 is coupled to the touchscreen 1302. The processor 1301 is configured to input a signal to the touchscreen 1302, and is further configured to receive a signal output by a touch driving integrated circuit in the touchscreen.

The touchscreen 1302 is configured to receive a detection signal generated when a touch operation is performed on the touchscreen 1302, and is further configured to perform display. The touchscreen 1302 may be an OLED screen, a micro LED screen, or an AMOLED screen.

The touchscreen 1302 may be the touchscreen described in any one of FIG. 3 and FIG. 7 to FIG. 12.

A second circuit board is disposed in the touchscreen of the electronic device. A trace at a conductive layer is coupled to the touch driving integrated circuit through a wire on the second circuit board, to drive and perform detection for the conductive layer, without adding a wire on a first circuit board for coupling to the trace at the conductive layer, thereby reducing wire crossover on the first circuit board, and reducing interference caused by wire crossover. In addition, a quantity of layers of the first circuit board can be reduced, thereby reducing process difficulty and costs.

It may be understood that the electronic device shown in FIG. 13 is merely an implementation of this embodiment. In actual application, the electronic device shown in FIG. 13 may alternatively include more or fewer components.

The foregoing descriptions are merely exemplary implementations of the embodiments, and are non-limiting. Any variation or replacement in the embodiments shall fall within the scope of the embodiments

What is claimed is:

1. A touchscreen, the touchscreen comprising a conductive layer, a display module, a first circuit board, and a second circuit board, wherein the conductive layer comprises a touch sensing electrode and N first traces, N is greater than or equal to 2, the first circuit board comprises a touch driving integrated circuit, and the second circuit board comprises at least one wire, wherein
the touch sensing electrode is coupled to a first end of each of the N first traces, a second end of each of M first traces is coupled to a first end of one wire on the second circuit board through the display module, and a second end of each wire on the second circuit board is coupled to the touch driving integrated circuit, wherein M is less than or equal to N, and the N first traces comprise the M first traces, whereby a coupling between the touch sensing electrode and the first end of each of the N first traces does not extend through the first circuit board or the second circuit board, and whereby a coupling between the second end of each wire on the second circuit board and the touch driving integrated circuit does not extend through the N first traces;
the display module is configured to perform display;
the touch sensing electrode is configured to generate a detection signal when a touch operation is performed on the touchscreen;
the at least one wire on the second circuit board is configured to couple the second end of each of the M first traces to the touch driving integrated circuit; and
the touch driving integrated circuit is configured to drive the touch sensing electrode, and receive the detection signal generated by the touch sensing electrode.

2. The touchscreen according to claim 1, wherein the first circuit board further comprises a first opening, the second circuit board further comprises a second opening, and an anisotropic conductive film is comprised between the first opening and the second opening; and
the second end of each wire on the second circuit board is coupled to the touch driving integrated circuit through the second opening, the anisotropic conductive film, and the first opening.

3. The touchscreen according to claim 1, wherein the display module comprises a thin film encapsulation layer, a display layer, and a substrate, wherein
the thin film encapsulation layer and the substrate are configured to encapsulate the display layer;
the display layer is configured to display;
the thin film encapsulation layer comprises at least two vias, each of the N first traces corresponds to one via at the thin film encapsulation layer, the at least two vias are dispersedly disposed in specific regions at the thin film encapsulation layer, and the specific region is a region that is at the thin film encapsulation layer and that corresponds to a frame of the touchscreen; and
the second end of each of the M first traces is coupled to the first end of the one wire on the second circuit board through a corresponding via.

4. The touchscreen according to claim 3, wherein the substrate further comprises at least two contacts, each of the N first traces corresponds to one contact on the substrate, and at least two second traces are routed on the substrate; and
each of the at least two contacts is configured to be coupled to a second end of one first trace, and coupled to a first end of one second trace, and a second end of each second trace is coupled to a first end of one wire on the second circuit board.

5. The touchscreen according to claim 4, wherein each of the at least two contacts corresponds to one second trace on the substrate; and
the second end of each second trace is coupled to the first end of the one wire on the second circuit board through the substrate; or
the second end of each second trace is coupled to the first end of the wire on the second circuit board sequentially through the substrate and the first circuit board.

6. The touchscreen according to claim 4, wherein the second trace is bonded to the substrate or the first circuit board by using the anisotropic conductive film.

7. The touchscreen according to claim 3, wherein a second end of each of the N first traces is directly coupled to a first end of one wire on the second circuit board through a corresponding via.

8. The touchscreen according to claim 3, wherein the substrate further comprises at least two contacts, each of the N first traces corresponds to one contact on the substrate, at least two second traces are routed on the substrate, and each of the at least two contacts corresponds to one second trace on the substrate; and
in the at least two second traces, second ends of some second traces each are coupled to a first end of one wire on the second circuit board, and second ends of the other second traces each are coupled to the touch driving integrated circuit sequentially through the substrate, the first circuit board, and the first opening.

9. The touchscreen according to claim 3, wherein the substrate further comprises a contact, a quantity of contacts is less than N, and each of the contacts corresponds to one second trace on the substrate; and
the second end of each of the M first traces is directly coupled to the first end of the one wire on the second circuit board through the corresponding via, and a second end of each of (N-M) first traces other than the M first traces is coupled to the touch driving integrated circuit through the via, the contact, the second trace corresponding to the contact, the first circuit board, and the first opening; or the M first traces comprise S first traces, S is less than or equal to M, a second end of each of the S first traces is directly coupled to a first end of one wire on the second circuit board through a corresponding via, a second end of each of (M-S) first traces other than the S first traces in the M first traces is coupled to a first end of one wire on the second circuit board through the via, the contact, and the second trace corresponding to the contact, and a second end of each of (N-M) first traces other than the M first traces in the N first traces is coupled to the touch driving integrated circuit through the via, the contact, the second trace corresponding to the contact, the first circuit board, and the first opening.

10. The touchscreen according to claim 1, wherein the first circuit board and the display module are bonded by using the anisotropic conductive film, or welded by using solder; and the second circuit board and the display module are bonded by using the anisotropic conductive film, or welded by using solder, and the second circuit board and the first circuit board are bonded by using the anisotropic conductive film, or welded by using solder.

11. The touchscreen according to claim 1, wherein a surface of the first circuit board and a surface of the second circuit board each comprise a protective film; and the protective film is configured to shield signal interference caused by crossover of wires on the first circuit board and the second circuit board.

12. An electronic device, comprising a processor and a touchscreen, wherein the processor is configured to receive a signal output by a touch driving integrated circuit in the touchscreen; and the touchscreen comprises a conductive layer, a display module, a first circuit board, and a second circuit board, the conductive layer comprises a touch sensing electrode and N first traces, N is greater than or equal to 2, the first circuit board comprises the touch driving integrated circuit, and the second circuit board comprises at least one wire, wherein the touch sensing electrode is coupled to a first end of each of the N first traces, a second end of each of M first traces is coupled to a first end of one wire on the second circuit board through the display module, and a second end of each wire on the second circuit board is coupled to the touch driving integrated circuit, wherein M is less than or equal to N, and the N first traces comprise the M first traces, whereby a coupling between the touch sensing electrode and the first end of each of the N first traces does not extend through the first circuit board or the second circuit board, and whereby a coupling between the second end of each wire on the second circuit board and the touch driving integrated circuit does not extend through the N first traces;

the display module is configured to display;

the touch sensing electrode is configured to generate a detection signal when a touch operation is performed on the touchscreen;

the at least one wire on the second circuit board is configured to couple the second end of each of the M first traces to the touch driving integrated circuit; and the touch driving integrated circuit is configured to drive the touch sensing electrode, and receive the detection signal generated by the touch sensing electrode.

13. The electronic device according to claim 12, wherein the first circuit board further comprises a first opening, the second circuit board further comprises a second opening, and an anisotropic conductive film is comprised between the first opening and the second opening; and the second end of each wire on the second circuit board is coupled to the touch driving integrated circuit through the second opening, the anisotropic conductive film, and the first opening.

14. The electronic device according to claim 12, wherein the display module comprises a thin film encapsulation layer, a display layer, and a substrate, wherein the thin film encapsulation layer and the substrate are configured to encapsulate the display layer;

the display layer is configured to display;

the thin film encapsulation layer comprises at least two vias, each of the N first traces corresponds to one via at the thin film encapsulation layer, the at least two vias are dispersedly disposed in specific regions at the thin film encapsulation layer, and the specific region is a region that is at the thin film encapsulation layer and that corresponds to a frame of the touchscreen; and the second end of each of the M first traces is coupled to the first end of the one wire on the second circuit board through a corresponding via.

15. The electronic device according to claim 14, wherein the substrate further comprises at least two contacts, each of the N first traces corresponds to one contact on the substrate, at least two second traces are routed on the substrate, and each of the at least two contacts corresponds to one second trace on the substrate; and in the at least two second traces, second ends of some second traces each are coupled to a first end of one wire on the second circuit board, and second ends of the other second traces each are coupled to the touch driving integrated circuit sequentially through the substrate, the first circuit board, and the first opening.

16. The electronic device according to claim 14, wherein the substrate further comprises a contact, a quantity of contacts is less than N, and each of the contacts corresponds to one second trace on the substrate; and the second end of each of the M first traces is directly coupled to the first end of the one wire on the second circuit board through the corresponding via, and a second end of each of (N-M) first traces other than the M first traces is coupled to the touch driving integrated circuit through the via, the contact, the second trace corresponding to the contact, the first circuit board, and the first opening; or the M first traces comprise S first traces, S is less than or equal to M, a second end of each of the S first traces is directly coupled to a first end of one wire on the second circuit board through a corresponding via, a second end of each of (M-S) first traces other than the S first traces in the M first traces is coupled to a first end of one wire on the second circuit board through the via, the contact, and the second trace corresponding to the contact, and a second end of each of (N-M) first traces other than the M first traces in the N first traces is coupled to the touch driving integrated circuit through the via, the contact, the second trace corresponding to the contact, the first circuit board, and the first opening.

17. The electronic device according to claim 14, wherein the substrate further comprises at least two contacts, each of the N first traces corresponds to one contact on the substrate, and at least two second traces are routed on the substrate; and each of the at least two contacts is configured to be coupled to a second end of one first trace, and coupled to a first end of one second trace, and a second end of each second trace is coupled to a first end of one wire on the second circuit board.

18. The electronic device according to claim 17, wherein each of the at least two contacts corresponds to one second trace on the substrate; and the second end of each second trace is coupled to the first end of the one wire on the second circuit board through the substrate; or the second end of each second trace is coupled to the first end of the wire on the second circuit board sequentially through the substrate and the first circuit board.

19. The electronic device according to claim 17, wherein the second trace is bonded to the substrate or the first circuit board by using the anisotropic conductive film.

20. The electronic device according to claim 14, wherein a second end of each of the N first traces is directly coupled to a first end of one wire on the second circuit board through a corresponding via.

\* \* \* \* \*